United States Patent
Musoll et al.

(10) Patent No.: US 11,349,626 B1
(45) Date of Patent: May 31, 2022

(54) RETIMER WITH PATH-COORDINATED FLOW-RATE COMPENSATION

(71) Applicant: Astera Labs, Inc., Santa Clara, CA (US)

(72) Inventors: Enrique Musoll, San Jose, CA (US); Subbarao Arumilli, Cupertino, CA (US); Ken (Keqin) Han, Fremont, CA (US); Pulkit Khandelwal, Cupertino, CA (US); Casey Morrison, San Jose, CA (US)

(73) Assignee: Astera Labs, Inc., Santa Clara, CA (US)

( * ) Notice: Subject to any disclaimer, the term of this patent is extended or adjusted under 35 U.S.C. 154(b) by 89 days.

(21) Appl. No.: 16/923,951

(22) Filed: Jul. 8, 2020

Related U.S. Application Data

(60) Provisional application No. 62/871,638, filed on Jul. 8, 2019.

(51) Int. Cl.
  *H04L 1/00* (2006.01)
  *H04L 5/00* (2006.01)

(52) U.S. Cl.
  CPC .......... *H04L 5/0083* (2013.01); *H04L 1/0007* (2013.01); *H04L 1/0057* (2013.01); *H04L 5/0087* (2013.01)

(58) Field of Classification Search
  None
  See application file for complete search history.

(56) References Cited

U.S. PATENT DOCUMENTS

| | | | |
|---|---|---|---|
| 8,161,210 B1 * | 4/2012 | Norrie | H04L 25/14 710/65 |
| 10,146,722 B1 | 12/2018 | Brown et al. | |
| 2010/0329285 A1 | 12/2010 | Stanton et al. | |
| 2011/0296073 A1 * | 12/2011 | Chuang | G06F 13/1684 710/310 |
| 2012/0082463 A1 | 4/2012 | Kasprzyk | |
| 2012/0140781 A1 * | 6/2012 | Green | G06F 13/4295 370/503 |
| 2014/0056370 A1 * | 2/2014 | Chang | H04L 25/14 375/259 |
| 2015/0288548 A1 * | 10/2015 | Allmendinger | H04L 25/14 370/252 |
| 2017/0351640 A1 | 12/2017 | Nilange et al. | |
| 2018/0253398 A1 * | 9/2018 | Wu | G06F 15/16 |

(Continued)

FOREIGN PATENT DOCUMENTS

| | | | |
|---|---|---|---|
| CN | 101667167 A | * | 3/2010 |
| JP | 2012063913 A | * | 3/2012 |

OTHER PUBLICATIONS

Intel Corporation (Samaan et al.), "High-Speed Serial Bus Repeater Primer—Re-driver and Re-timer Micro-architecture, Properties and Usage," Revision 1.2, Oct. 2015, 72 pages.

(Continued)

*Primary Examiner* — The Hy Nguyen
(74) *Attorney, Agent, or Firm* — Charles Shemwell

(57) ABSTRACT

A signaling link retimer injects flow-rate compensation transmissions into a synthesized symbol stream in coordination with flow-rate compensation transmissions detected within a received symbol stream, enabling the retimer to switch seamlessly between forwarding the received symbol stream and outputting the synthesized symbol stream.

16 Claims, 4 Drawing Sheets

(56) References Cited

U.S. PATENT DOCUMENTS

2019/0258600 A1    8/2019   Sharma
2020/0145341 A1*   5/2020   Das Sharma ....... G06F 13/4282

OTHER PUBLICATIONS

Intel Corporation, "PCI Express (PCIe) 4.0 Retimer Supplemental Features and Standard BGA Footprint, Revision 004," Jun. 2018, 53 pages.
PCI-SIG, "PCI Express Base Specification Revision 5.0 Version 1.0", May 22, 2019, 1299 pages.

* cited by examiner

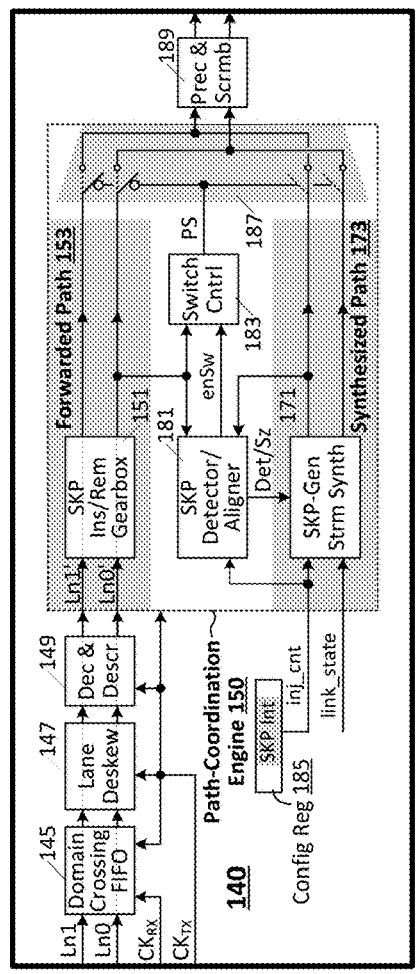
FIG. 1 Retimer with Path Coordinated Flow-Rate Compensation (PCFC)
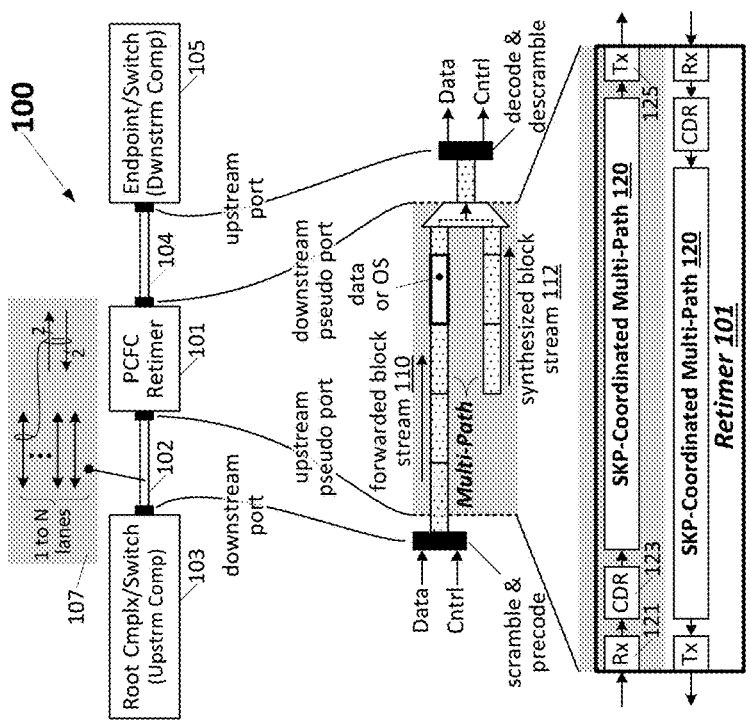
FIG. 2 SKP-Coordinated Multi-Path

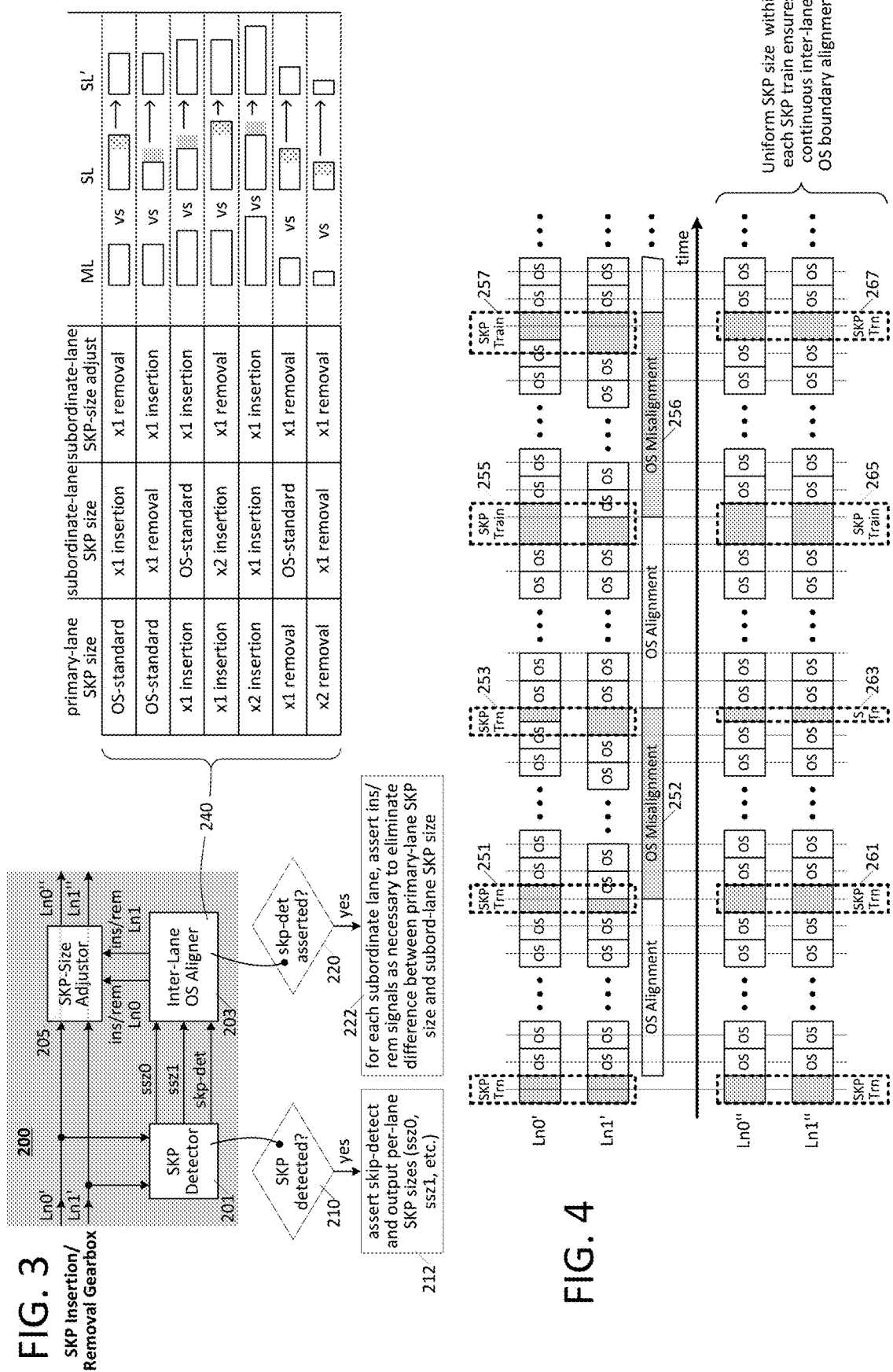

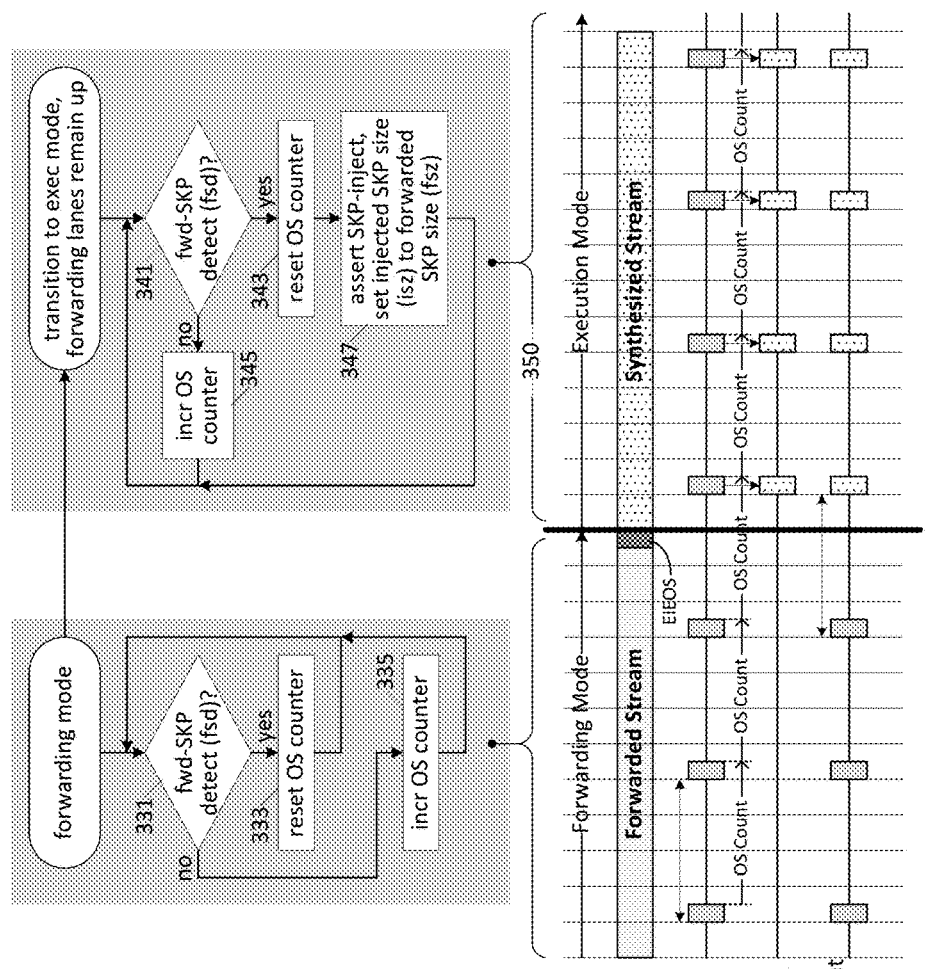
FIG. 7 Subordinated SKP Injection
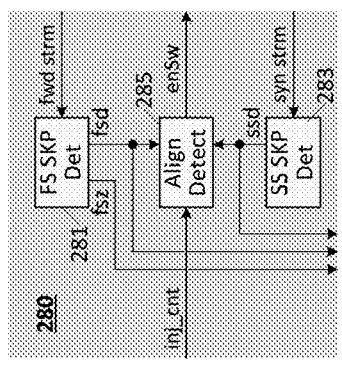
FIG. 5 SKP Detector/Aligner
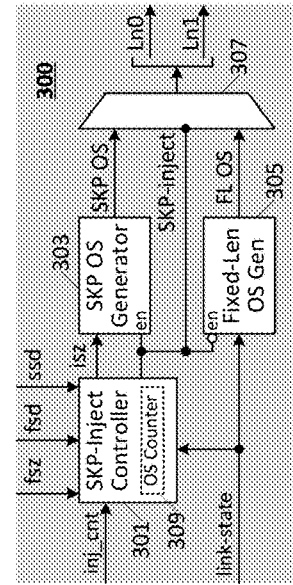
FIG. 6 SKP-Generating Stream Synthesizer

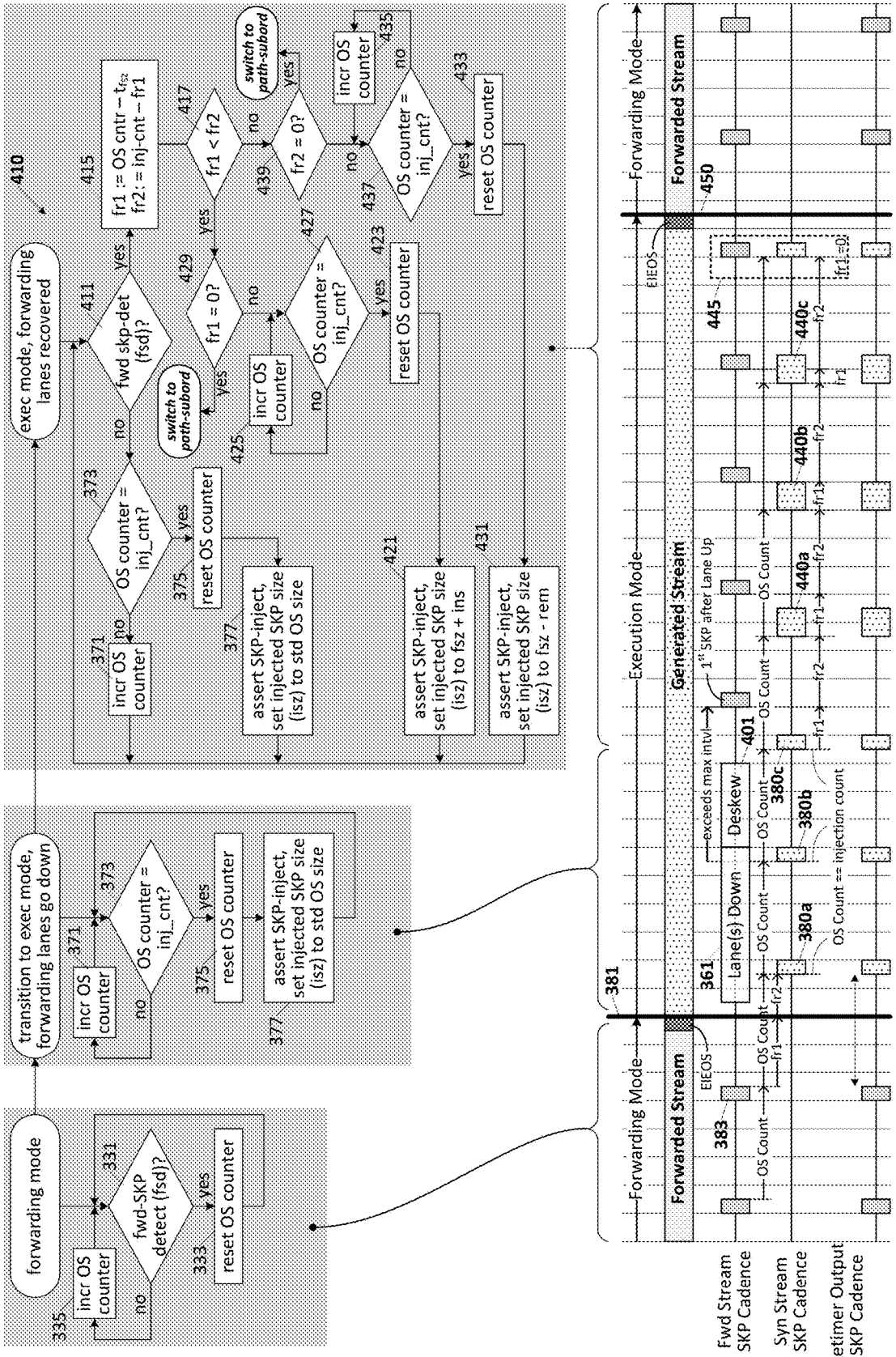

RETIMER WITH PATH-COORDINATED FLOW-RATE COMPENSATION

CROSS REFERENCE TO RELATED APPLICATIONS

This application hereby incorporates by reference and claims the benefit of U.S. provisional application No. 62/871,638 filed Jul. 8, 2019.

DRAWINGS

The various embodiments disclosed herein are illustrated by way of example, and not by way of limitation, in the figures of the accompanying drawings and in which like reference numerals refer to similar elements and in which:

FIG. 1 illustrates, in the context of a synchronous signaling system, an embodiment of a signaling link retimer that injects flow-rate adjustment transmissions into a synthesized symbol stream in coordination with flow-rate adjustment transmissions within a received symbol stream;

FIG. 2 illustrates an embodiment of a coordinated multi-path that may implement each of the multi-paths shown in FIG. 1;

FIG. 3 illustrates an embodiment of a skip-ordered-set (SKP ordered set) insertion/removal gearbox that detects SKP ordered sets within constituent lanes of a forwarded-traffic path and adjusts sizes of detected SKP ordered sets as necessary to maintain inter-lane ordered-set boundary alignment;

FIG. 4 illustrates an exemplary operation of the FIG. 3 SKP insertion/removal gearbox;

FIG. 5 illustrates an embodiment of SKP detector/aligner that may be deployed within the path coordination engine of FIG. 2;

FIG. 6 illustrates an embodiment of a SKP-generating stream synthesizer that receives the SKP-detect and SKP-size signals from the FIG. 5 detector/aligner;

FIG. 7 illustrates an example of the path-subordinated injection strategy implemented by the FIG. 6 SKP injection controller upon retimer transition from forwarding mode to execution mode; and FIG. 8 illustrates examples of autonomous and then progressive SKP injection strategies implemented by the FIG. 6 injection controller after retimer transition from forwarding mode to execution mode and subsequent flow-cessation and resumption within a forwarded symbol stream.

DETAILED DESCRIPTION

In various embodiments herein, a signaling link retimer injects flow-rate compensation transmissions into a synthesized symbol stream in coordination with flow-rate compensation transmissions detected within a received symbol stream, enabling the retimer to switch seamlessly between forwarding the received symbol stream and outputting the synthesized symbol stream. In embodiments having multiple signaling lanes per link, the retimer corrects any lane-to-lane content-boundary misalignment within the received ("forwarded") symbol stream before coordinating injection of flow-rate compensation transmissions into the synthesized symbol stream, for example, by detecting non-uniformity in flow-rate compensation transmissions on one or more lanes relative to another and revising flow-rate compensation transmissions on individual lane(s) as necessary to restore uniformity. In those and other embodiments, upon switchover to the synthesized symbol stream, the retimer injects flow-rate compensation transmissions—variable-length transmissions that enable load-pointer adjustment within downstream first-in-first-out buffers (FIFOs) as necessary to compensate for differences between the FIFO load rate set by one clock domain and the FIFO unload rate set by another clock domain—into the synthesized symbol stream in response to (i) continued flow-rate compensation transmissions within the forwarded symbol stream, (ii) self-timed offset from a final flow-rate compensation transmission within the forwarded symbol stream that precedes cessation of flow-rate compensation transmission within the forwarded symbol stream (e.g., as happens when the forwarded symbol stream itself drops out) and (iii) self-timed offset from the final (pre-cessation) flow-rate compensation transmission within the forwarded stream with transmission-length extension or reduction to progressively/iteratively reduce offset (or achieve alignment) between flow-rate compensation transmissions within the synthesized stream and newly commenced flow-rate compensation transmissions within the forwarded symbol stream. These and other embodiments and features are presented in further detail below.

FIG. 1 illustrates an embodiment of a synchronous signaling system 100 having a path-coordinated flow-rate compensating (PCFC) retimer 101 coupled between upstream and downstream components 103, 105, via respective signaling links 102 and 104. Retimer 101 extends the viable signaling path length between the upstream and downstream components by applying timing information and digital data recovered from an inbound symbol stream (sourced by either component 103, 105 and destined for the other) to produce an enhanced-integrity outbound symbol stream (with occasional content modification)—overall, permitting the upstream and downstream components to communicate reliably (e.g., meeting specified bit error rate) over otherwise impracticable distances.

For purposes of example and clarity of explanation, signaling links 102, 104 and driver/receiver ports within retimer 101, upstream component 103, and downstream component 105 (i.e., downstream port of component 103, upstream port of component 105 and upstream/downstream pseudo ports of retimer 101, as shown) are assumed to implement a Peripheral Component Interconnect Express (PCIe) communication specification and thus described in the terminology of that specification. Accordingly, upstream component 103 may be a root complex or switch and the downstream component 105 may be an endpoint or switch, and the signaling link coupled between a given pair of components (i.e., upstream component and retimer or downstream component and retimer) may be implemented by 1 to N lanes (e.g., 1, 2, 4, 8, 12, 16, 32, etc.) with each lane including a dedicated differential signaling pair for each signaling direction—an arrangement generally shown at 107.

Symbols conveyed in respective unit intervals on a given lane (i.e., duration of a valid symbol at a given point on a differential conductor pair) are assumed to be bits so that each unit interval (UI) is a bit time ($t_{bit}$). Further, information is scrambled and (in some cases) precoded prior to transmission (i.e., encoded for spectral diversity and/or other signal integrity purposes) into 130-bit logical blocks that correspond to 128 bits of raw content (i.e., 128b/130b encoding scheme) and two bits of block encoding. Each logical block ("block" for short) conveys either physical-layer control information—so-called "ordered-set" blocks—or payload information (including control information for higher PCIe protocol layers) in "data" blocks. Unless otherwise stated or clear from context, references herein to data streams (or block streams or bit streams or symbol streams) should be understood to include serial streams of order-set blocks ("ordered-sets") and/or data blocks, and references to "data" should be likewise be understood to include control information (i.e., contents of ordered-set blocks) and/or payload information. For ease of understanding, link (or interconnect) operation is occasionally described below in the context of a single lane—in all cases the link may include multiple lanes each conveying respective serial block streams. In the high-speed, embedded-clock, scrambled and precoded signaling contemplated herein (e.g., 16 giga-transfers per second (16 GT/s) with, for example, one single-bit symbol transfer per cycle of a 16 GHz transmit clock or one two-bit symbol transfer (e.g., 4-PAM per cycle of an 8 GHz transmit clock) each of the system components (101, 103, 105) generally includes receive/transmit equalization circuitry, lane-to-lane skew compensation circuitry, clock/data recovery (CDR) circuitry, clock-domain crossing circuitry, data scrambling and descrambling circuitry and data precoding/decoding circuitry. In all embodiments, these various circuit elements may be supplemented by others and/or omitted (e.g., lane deskew circuitry omitted or disabled in a single-lane signaling system), faster or slower transfer rates may apply, other logical data organization and/or physical signaling line configuration may apply, 4-level pulse amplitude modulation (4-PAM) symbols (two-bits per symbol) or other multiple-bit symbols may be conveyed on each or any lane per UI, and more generally, physical signaling and signaling protocols according to specifications other than PCIe may be implemented. Also, while block precoding is shown and described with respect to the FIG. 1 embodiment and those discussed below, precoding (and corresponding decoding) may be disabled or omitted altogether in all cases. Though a single link retimer is shown between components 103 and 105, one or more additional retimers (and/or re-drivers or other reach-extension devices) may be deployed to further extend the practicable signaling distance between components 103 and 105. In such cases, the component downstream and/or upstream from PCFC link retimer 101 may be another link retimer.

Continuing with FIG. 1, retimer 101 responds to link status and other control information by transitioning between various operating modes that include, fundamentally, a forwarding mode in which the retimer receives and retransmits (forwards) a scrambled and precoded stream of blocks (forwarded block stream 110) and an execution mode in which a synthesized (self-generated) block stream 112 is transmitted instead of the forwarded block stream. Run-time switching between forwarded and synthesized block streams ("path switching") is complicated by the precoding and scrambling of the forwarded symbol stream as switching at any point other than a block boundary will break the downstream decoding operation and switching from one stream to the other without resetting (or reseeding) the scrambler/descrambler circuits at counterpart sides of the link (102 or 104) will yield incoherent descrambler output. On top of these complications, a special flow-rate-compensation ordered-set called a skip ordered set (SKP or SOS) is embedded at nominal intervals within the block stream conveyed between any two link components to enable the recipient component to compensate—by removing/inserting prescribed numbers of bits from/into the SKP ordered set—for slight differences in frequency (or phase) between the clock used to transmit the block stream and an internal clock within the recipient component. In contrast to SKP-consuming destination components (i.e., 103, 105), the retimer re-transmits SKPs within the forwarded stream after occasional bit insertion/removal (and thus a SKP block size larger or smaller than the otherwise uniform 130-bit block size), opening the door to possible lane-to-lane mismatch in SKP sizes and/or loss of block boundary alignment between synthesized and forwarded streams—either phenomenon rendering block-boundary path switching infeasible. Moreover, even where the synthesized and forwarded streams are block-boundary aligned, transition from one stream to the other may occasionally yield an unusually short or long SKP-to-SKP interval (i.e., last SKP in former stream, first SKP in latter stream) that may violate the proscription against back-to-back SKPs or the maximum permissible SKP interval (an interval chosen to avoid overflow/underflow of clock-domain-crossing FIFO under worst-case clocking conditions).

PCFC retimer 101 overcomes the aforementioned complications through implementation of multiple switched paths ("multi-path") in which SKPs conveyed via a forwarded path (i.e., in a forwarded block stream) are revised as necessary to achieve uniform SKP size across all lanes; and in which SKP injection into a block stream conveyed via a synthesized path (i.e., synthesized block stream) is coordinated with SKPs detected within forwarded block stream to ensure SKP interval compliance in both path-switch directions—from forwarded path to synthesized path and from synthesized path to forwarded path. More specifically, in a number of embodiments, SKP-coordinated multi-path circuitry 120 is implemented for each retimer flow direction (upstream or downstream between receive/CDR circuits 121/123 and transmit circuit 125) to:

inject SKPs into a synthesized stream (i.e., after switchover from forwarded path to synthesized path) in response to SKPs detected within a continuing flow of an incoming block stream;

inject SKPs into the synthesized stream following path switchover (from forwarded path to synthesized path) and flow-cessation/disruption within the forwarded path with deterministic timing offset, $i*t_{inject}$, relative to a SKP detected within the forwarded path prior to flow-cessation, where 'i' is the ordinal number of the injected SKP (i=1, 2, 3, . . . ) and $t_{inject}$ is a pre-programmed or trained SKP-to-SKP interval; and inject SKPs into the synthesized stream with SKP size set according to (i) counterpart SKPs detected within an incoming block stream ("incoming SKPs"), and (ii) timing offset between injected and incoming SKPs (as may develop after forwarded-path flow-cessation and subsequent flow-restoration) so as to progressively/iteratively reduce the synthesized-stream/forwarded-stream SKP timing offset and thus enable path-switch from synthesized to forwarded stream without SKP interval violation.

FIG. 2 illustrates an embodiment of a SKP-coordinated multi-path 140 that may be deployed within the FIG. 1 retimer to implement each of counter-flowing multi-paths 120. In the two-lane example shown (there may be more or fewer than two lanes in all embodiments presented herein), incoming block streams conveyed on respective lanes ("Ln0", "Ln1") pass through a clock-domain-crossing FIFO 145 (e.g., an elastic FIFO or drift buffer that is loaded in response to transitions of a receive clock, $CK_{RX}$ and unloaded in response to a transmit clock, $CK_{TX}$), a lane-deskew circuit 147 that corrects lane-to-lane timing skew and then a decoding/descrambling block 149 which descrambles the block stream on each lane (e.g., via a linear feedback shift register (LFSR) that is synchronized through EIEOS-triggered seeding with a counterpart LFSR within the stream-originating link component) and then decodes individual blocks within the block stream (e.g., reversing transmit-side 128b/130b encoding) to yield a per-lane descrambled/decoded block stream at the input of path-coordination engine 150. In the depicted embodiment, transmit clock $CK_{TX}$ (which may be plesiochronous or mesochronous with respect to CDR-recovered receive clock, $CK_{RX}$) is supplied to all component circuits following domain-crossing FIFO 145, including the lane deskew and decoder/descrambler circuitry (147, 149) as well as clock-synchronized circuitry within path coordination engine 150.

Still referring to FIG. 2, path coordination engine 150 includes a SKP insertion/removal gearbox 151 to enforce inter-lane SKP alignment within forwarded path 153, and a SKP-generating stream synthesizer 171 to generate (synthesize) and drive a SKP-bearing symbol stream via synthesized path 173. The path coordination engine additionally includes SKP detector/aligner circuitry 181 to coordinate SKP injection within the SKP-generating synthesizer 171 with SKPs detected within the forwarded path, and switch control circuitry 183 to strategically switch the source of the retimer output between the forwarded and synthesized paths (153, 173) in response to, for example and without limitation, EIEOS detection within the forwarded stream (stream propagating through forwarded path 153) and a switch-enable signal (enSw) from the SKP detector/aligner. Link management circuitry (not specifically shown) within multipath 140 or elsewhere within the host retimer provides link-state information ("link_state") to stream synthesizer 171 indicating the status of the forwarded path (lanes operable/up and conveying live forwarded symbol stream, lanes down/forwarded-flow cessation, lanes restored to operability after flow cessation, etc.) as well as the present retimer mode (forwarding mode/execution mode) and or pending request to switch between retimer modes. A pre-programmed SKP interval field ("SKP Int") within configuration register 185 supplies an injection-count value ("inj_cnt") to stream synthesizer 171—a value that, as discussed below, enables interval-based SKP injection within the synthesized symbol stream during loss or recovery of the forwarded stream. In one embodiment, the link-state information is additionally supplied to switch controller 183 which responds to requests to switch between retimer modes by transitioning path-switch signal (PS) between forwarding and execution states (and thus coupling, via path switch/multiplexer 187, either forwarded path 153 or synthesized path 173 to a transmit-side precoder/scrambler 189 for generation of outbound symbol stream) in accordance with content of the forwarded symbol stream and switch-enable signal from SKP detector/aligner 181.

FIG. 3 illustrates an embodiment of a SKP insertion/removal gearbox 200 (which may be deployed as gearbox 151 of FIG. 2) that detects SKP ordered sets within constituent lanes of the forwarded-traffic path (lanes L0'/L1' in the example shown, with the apostrophe denoting conveyance of decoded/descrambled blocks) and adjusts sizes of detected SKPs sets as necessary to maintain inter-lane ordered-set (OS) boundary alignment. In the depicted example, gearbox 200 includes SKP detector 201, inter-lane OS aligner 203 and SKP-size adjustor 205. Detector 201 monitors forwarded traffic and, upon detecting SKPs within the forwarding lanes (such SKPs commencing on all lanes simultaneously by virtue of their simultaneous source-component transmission and lane-deskewing within retimer) informs inter-lane OS aligner 203 of the SKP detection (asserting skp-det) and the size of the SKP ordered set conveyed on each lane (ssz0, ssz1 in the two-lane example shown)—operations shown in flow-diagram form at 210 and 212. Inter-lane OS aligner 203 responds to skip-detect signal assertion (affirmative determination at 220) by comparing the per-lane SKP sizes and asserting size-adjustment signals—bit insertions or bit removals as shown at 222—to SKP size adjustor 205. More specifically, in one embodiment gearbox 200 designates one of the forwarded-path lanes to be a primary lane (i.e., designating primary-lane status programmatically, through fixed design or dynamically in response to link information as in one or more lanes remain operable after others go down) and the remaining operable lanes as subordinate lanes. Aligner 203 applies the primary/subordinate lane designations by issuing insertion/removal signals (size-adjustment signals) to adjustor 205 for all subordinate lanes in which the SKP size does not match the primary-lane SKP size (as shown at 222). In one embodiment, insertion and removal granularity is constrained to units of 32 bits ("adjustment unit"), with the unmodified SKP size matching the OS block size (i.e., 130 bits after precoding, 128 bits after decoding) and permissible adjustments constrained to 1 or 2 adjustment units. Accordingly, SKP sizes may be designated as OS-standard, x1 insertion (meaning OS standard+1 adjustment unit), x2 insertion (OS standard+2 adjustment units), x1 removal (OS standard−1 adjustment unit, or x2 removal (OS standard−2 adjustment units). Truth table 240 illustrates exemplary size adjustments (bit insertions/removals) conveyed to SKP size adjustor 205 for each subordinate lane in which the incoming SKP size does not match the primary-lane SKP size, and in which per-lane SKP size inequality on incoming lanes Ln0', Ln1' is constrained to a single adjustment unit (i.e., illegal condition for lane to lane SKP sizes to vary by more than one adjustment unit). Note that other adjustment granularities and permissible range of adjustments may apply in alternative embodiments.

FIG. 4 illustrates an exemplary operation of the FIG. 3 SKP insertion/removal gearbox, showing non-uniform SKP sizes within SKP trains 251, 253, 255 and 257 (i.e., each SKP train constituted by collective set of SKP ordered sets arriving at the insertion/removal gearbox simultaneously on respective lanes of forwarded path) and the consequent per-lane OS boundary misalignment 252, 256. Designating Ln0' as the primary lane, the insertion/removal gearbox detects each incoming SKP train and, in response to the SKP size non-uniformity in trains 251-257 adjusts subordinate lane (Ln1') SKP sizes—issuing a x1 insertion for incoming SKP train 251 to yield inter-lane SKP size uniformity in SKP train 261 driven onto outgoing lanes (Ln0"/Ln1") and similarly issuing a x1 subordinate-lane removal with respect to inbound SKP train 253 to yield outbound SKP train 263; a x1 subordinate-lane insertion with respect to inbound SKP train 255 to yield outbound SKP train 265; a x1 subordinate-lane removal with respect to inbound SKP train 257 to yield output bound SKP train 267 and so forth.

In one embodiment, per-lane SKP size non-uniformity results from independent operation of SKP insertion/removal activity within the domain-crossing FIFO (e.g., element 145 of FIG. 2) as slight timing differences in per-lane FIFO loading (or unloading) operations may trigger insertions or removals on one lane within a given SKP train that are not applied for the other lane until a subsequent SKP train (hence the shortened SKP in Ln1' in SKP train 251 and its Ln0' counterpart in ensuing SKP train 253—ditto for the extended SKPs in Ln0' and Ln1', respectively, in successive SKP trains 255 and 257). Despite the self-correction in successive SKP trains, each initial inter-lane SKP size inequality (within a self-correcting SKP train pair) results in temporary lane-to-lane OS-boundary misalignment as shown at 252 and 256, rendering OS-boundary-aligned path switching infeasible at least during that period. The period of path-switch infeasibility (path switching disallowed) may be extended substantially in "worst case" scenarios where, for example, the EIEOS cadence coincides with periods of OS boundary misalignment—in extreme cases, yielding a starvation effect in which path switch is disallowed for so long that other link operations/events cannot be implemented within standard-specified time intervals and/or under standard-specified conditions. The inter-lane SKP size uniformity restored/ensured by the SKP insertion/removal gearbox avoids these temporary periods of misalignment, avoiding worst-case starvation scenarios and enabling more prompt (less latent) path switching.

FIG. 5 illustrates an embodiment of SKP detector/aligner 280 that may be deployed within the path coordination engine of FIG. 2 to implement SKP detector/aligner 181. In the depicted example, detector/aligner 280 includes SKP detectors 281 and 283 to receive and detect SKP ordered sets within the forwarded and synthesized symbol streams, respectively. The forwarded-stream SKP detector (281) outputs, to alignment detection circuit 285 and other path-coordination circuitry (as discussed below), a forward-SKP-detect signal ("fsd") together with a forwarded SKP size value (fsz) upon detecting a SKP ordered set within the forwarded block stream. Synthesized-stream SKP detector 283 similarly detects SKP ordered sets within the synthesized stream, asserting a synthesized-SKP-detect signal ("ssd") to alignment detector 285 in response. Alignment detecto4 circuit 285 determines, based on the relative assertion times of the SKP detection signals for the two block streams (fsd, ssd), whether SKPs within those streams are sufficiently aligned to enable switching between forwarded and synthesized paths without exceeding a programmed or otherwise predetermined maximum permissible interval between SKPs in the retimer output—i.e., that the time from the final SKP within the formerly transmitted stream to the initial SKP within the newly transmitted stream will not exceed that maximum-permissible SKP interval.

In one embodiment, alignment detector 285 asserts switch-enable signal "enSw" to enable path control circuitry to switch between streams in response to determining that SKPs within the forwarded and synthesized block streams are completely aligned (i.e., commencing at the same OS boundary or clock edge). In other embodiments or configurations (e.g., according to programmed settings within the configuration register shown in FIG. 2), alignment detector 285 asserts the switch-enable signal in response to determining that SKPs within the forwarded and synthesized streams are within a predetermined (e.g., programmably specified) offset, including a specified fraction of a maximum permissible SKP interval, or a specified fraction of an injection count value, the latter being an ordered-set count value that specifies a SKP cadence (or frequency) of SKP insertions within the synthesized stream following flow-cessation within the forwarded stream.

FIG. 6 illustrates an embodiment of a SKP-generating stream synthesizer 300 that receives the SKP-detect and SKP-size signals from the FIG. 5 detector/aligner, as well as the injection count value and link-state information discussed above—an embodiment that may be deployed as stream synthesizer 171 of FIG. 2. In the example shown, stream synthesizer 300 includes a SKP-inject controller 301, SKP ordered-set generator 303, fixed-length ordered-set generator 305 and ordered-set selector 307 that cooperatively synthesize a stream of non-SKP ordered-sets punctuated by nominally regular SKP ordered sets. More specifically, SKP-inject controller 301 ("injection controller") responds to incoming SKP detection signals (fsd, ssd), SKP size signals (fsz), link-state information and injection count by asserting and deasserting a SKP-inject signal to alternately enable operation of the SKP OS generator 303 and fixed-length OS generator 305. When the SKP-inject signal is deasserted (e.g., logic low) and the link-state specifies an execution mode within the host retimer, fixed-length OS generator 305 outputs a stream of fixed-length ordered sets (e.g., 128-bit blocks to be precoded to 130-bit blocks) of various types, including EIEOS ordered sets on regular intervals to maintain synchronicity between pre-transmission output scrambler (e.g., element 189 in FIG. 2) and destination component descrambler. Conversely, when injection controller 301 asserts the SKP-inject signal, fixed-length OS generator 304 is disabled (interrupted) while SKP OS generator 303 injects a SKP ordered set into the synthesized stream via selector/multiplexer 307. In the depicted embodiment, the size of the injected SKP is set according to an injection-size signal (isz) output by injection controller 301 concurrently with injection signal assertion. After SKP injection is completed, the inject controller lowers the SKP-inject signal, re-enabling OS emission from fixed-length OS generator 305 and reconfiguring selector 307 to forward the fixed-length OS block stream to the synthesizer output.

In one embodiment, injection controller 301 commences operation upon retimer transition from forwarding mode to execution mode, implementing various SKP injection strategies in accordance with status of the forwarded (inbound) block stream. More specifically, upon initial transition to execution mode, injection controller implements a path-subordinated injection strategy so long as lanes within the forwarded path continue to convey traffic (i.e., "lanes remain up"), transitioning to an autonomous injection strategy when lanes of the forwarded path go down (traffic flow cessation), and then to a progressive injection strategy when the forwarding lanes are restored to operability (traffic flow resumed).

FIG. 7 illustrates an example of the path-subordinated injection strategy implemented by the FIG. 6 SKP injection controller (301) upon retimer transition from forwarding mode to execution mode, showing both operational flow within the injection controller (cycling through the flow at ordered-set intervals) and exemplary SKP cadences within the forwarded, synthesized and retimer output streams. As shown, prior to mode transition (and EIEOS-boundary path switching from forwarded to synthesized stream), the injection controller responds to SKP detection within the forwarded stream (i.e., fsd signal assertion triggering affirmative determination at 331) by resetting an ordered-set counter (e.g., element 309 of FIG. 6) at 333 and otherwise allows the OS count to accrue (increment) for each ordered-set (335). By this operation, at any point between SKP detection events, the OS counter indicates the number of ordered sets (or data blocks) conveyed since the last SKP detection. After transitioning to execution mode, the injection controller continues to increment and reset the OS counter according to whether an evaluated block is or is not a SKP OS (i.e., as shown at 341, 343, 345), but additionally triggers SKP injection into the synthesized stream in response to forwarded-path SKP detection (347). In the embodiment shown, the injection controller outputs an injected SKP size value to the SKP OS generator (i.e., issuing value "isz" to element 303 of FIG. 6) in accordance with the SKP size in the forwarded stream, thus ensuring OS-boundary alignment between the forwarded and synthesized streams. Referring to SKP cadence diagram 350, SKPs are injected into the synthesized stream (and thus appear in the retimer output) in response to SKP detections within the forwarded stream.

FIG. 8 illustrates examples of autonomous and then progressive SKP injection strategies implemented by the FIG. 6 injection controller after retimer transition from forwarding mode (i.e., where injection controller increments OS counter for each non-SKP OS, and resets OS counter after each SKP detection as shown at 331, 333, 335) to execution mode and subsequent flow-cessation (as shown at 361 within the forwarded-stream SKP cadence) and resumption within forwarded stream. While the forwarded lanes remain down, injection controller operates autonomously (i.e., without regard to events within the forwarded path) by incrementing the OS counter on OS block intervals 371 and injecting a standard-sized SKP (i.e., matching nominal OS size) into the synthesized stream—i.e., asserting SKP-inject with isz=OS standard—each time the OS count rises to the configuration-register-supplied injection count (affirmative determination at 373, followed counter reset at 375 and SKP-inject and isz assertion as shown at 377). By this operation, SKPs are injected into the synthesized stream at regular intervals according to the programmed injection count as shown at 380*a*, 380*b*, 380*c* within the synthesized stream SKP cadence. Note also that, because the OS counter is operated continuously through the retimer mode transition (i.e., continuing to count OS blocks before and after the mode transition at 381), the fractional OS counts before and after mode switch (depicted as "fr1" and "fr2" respectively within the SKP cadence diagram) cumulatively establish a cross-transition SKP injection interval (i.e., from the last SKP in forwarding mode 383 to the first in execution mode 380*a*) corresponding to the programmed injection count and thus an interval ensured not to violate maximum/minimum SKP-to-SKP timing constraints.

Still referring to execution-mode operation in FIG. 8, when forwarding lanes are restored (i.e., after the deskew interval shown at 401), SKPs autonomously injected into the synthesized block stream and SKPs within the newly restored forwarded block stream will have an arbitrary timing offset—meaning that, abruptly transitioning to sub-ordinate mode or forwarding mode may result in a non-compliant (too long or too short) SKP interval. In one embodiment, the injection controller avoids this non-compliance by progressively increasing or delaying the synthesized-stream SKP injection until SKPs within the two streams are either completely aligned or sufficiently aligned to ensure cross-transition SKP interval compliance. Referring to the conceptual operations at 410, until a SKP is detected within the forwarded stream at 411, the autonomous SKP injections operations at 371, 373, 375 and 377 are continued (i.e., as in autonomous skip injection discussed above, but with added operation of determining at 411 whether the most recently registered ordered set is a SKP). Upon detecting a SKP within the forwarded stream (affirmative determination at 411), the injection controller determines whether, at that point, the OS counter has incremented more than halfway through the injection count—an operation shown conceptually at 415 by generation of a fractional count value corresponding to the time (shown as "fr1" in the FIG. 8 cadence diagram) between the commencement of the prior synthesized SKP and the commencement of the SKP detected in the forwarded stream (i.e., value in the OS counter minus the temporal size of the forwarding-path SKP, $t_{fsz}$) and a residual fractional count value "fr2" that must additionally accumulate within the OS counter to reach the injection count (i.e., injection count minus fr1) and comparison of those two fractional values at 417. If the OS counter is less than halfway through the injection count (affirmative determination at 417), then the most rapid path-to-path SKP timing convergence can be achieved through progressively delaying injection of subsequent SKPs into the synthesized stream—a progression achieved by injecting a size-extended SKP into the synthesized stream at 421 (and resetting the OS counter at 423) each time the OS counter increments (425) to the injection count (427) until the synthesized SKP is aligned with a SKP in the forwarded stream (i.e., affirmative determination at 429, when fr1=0—at which point the injection controller switches to path-subordinated injection as shown at 350 in FIG. 7). Conversely, if the OS counter is more than halfway through the injection count (fr2>fr1 and thus negative determination at 417), then path-to-path SKP timing convergence is most quickly achieved by progressively advancing injection of subsequent SKPs into the synthesized stream. This progression is achieved by injecting a size-reduced SKP into the synthesized stream at 431 (and resetting the OS counter at 433) each time the OS counter increments (435) to the injection count (437) until the synthesized SKP is aligned with a forwarded-stream SKP (affirmative determination at 439, when fr2=0), at which point the injection controller switches to path-subordinated injection. An example of progressively delayed SKP injection is shown at in the synthesized stream SKP cadence, with the SKPs injected at 440*a*, 440*b* and 440*c* being sized one adjustment unit larger than the most recently detected forwarded-path SKP, yielding inter-path SKP alignment at 445. As discussed above in reference to FIG. 5, alignment detector 285 detects the path-to-path SKP alignment and asserts the switch-enable signal, opening a window for switch controller (e.g., element 183 of FIG. 2) to execute an opportunistic path switch (e.g., reverting to forwarding mode at next EIEOS detection as shown at 450 in FIG. 8). Note that complete path-to-path SKP alignment may not be necessary in all cases. Rather, so long as the total elapsed time between cross-transition SKPs is within a prescribed or programmed compliance interval, offset between forwarded-path and synthesized-path SKPs may be tolerated. In one embodiment, for example, the FIG. 5 alignment detector (285) asserts the switch-enable signal whenever the path-to-path SKP offset in combination with the interval between forwarded-path SKPs (as may be determined by OS counter at forwarded SKP detection) is less than the maximum permissible SKP interval, thus enabling more rapid transition from execution mode to forwarding mode after forwarded traffic flow is restored.

Referring to FIGS. 1-8 generally, one or more programmed microcontrollers and/or dedicated hardware circuits (e.g., finite state machines, registered or combinational circuits, etc.) may be provided to implement all or part of the various architectural and functional elements within the retimer embodiments presented herein. Additionally, any or all of those architectural/functional elements (including the entirety of the retimer architecture) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various signaling rates and related frequencies, lane counts, block sizes, encoding/decoding schemes and so forth are provided for purposes of example only—higher/lower/alternative rates, frequencies, lane counts, block sizes, encoding schemes etc. may be implemented in all cases. Similarly, signaling link parameters, protocols, configurations may be implemented in accordance with any practicable open or proprietary standard (PCIe being but one example) and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit component comprising:
   symbol-stream reception circuitry to receive a first stream of fixed-length blocks of symbols having first length-modifiable blocks of symbols spaced from one another at first intervals within the first stream; and
   symbol-stream synthesizing circuitry to embed second length-modifiable blocks of symbols at second intervals within a second stream of fixed-length blocks of symbols, including stream alignment circuitry to adjust lengths of successive ones of the second length-modifiable blocks relative to counterpart ones of the first length-modifiable blocks to reduce a temporal misalignment between the first and second intervals;
   wherein the stream alignment circuitry to adjust lengths of successive ones of the second length-modifiable blocks comprises circuitry to determine whether first temporal offset between a selected one of the second length-modifiable blocks and prior-received one of first length-modifiable blocks is greater or less than second temporal offset between the selected one of the second length-modifiable blocks and an after-received one of the first length-modifiable blocks; and
   wherein the stream alignment circuitry to adjust lengths of successive ones of the second length-modifiable blocks comprises circuitry to increase the length of at least one of the second length-modifiable blocks by a predetermined number of symbols relative to the length of a counterpart one of the first length-modifiable blocks if the first temporal offset is greater than the second temporal offset, and to decrease the length of the at least one of the second length-modifiable blocks by a predetermined number of symbols relative to the length of the counterpart one of the first length-modifiable blocks if the first temporal offset is less than the second temporal offset.

2. The integrated circuit component of claim 1 wherein the symbol-stream synthesizing circuitry to embed the second length-modifiable blocks of symbols at second intervals within the second stream of fixed-length blocks of symbols comprises block injection circuitry to inject each of the second length-modifiable blocks of symbols into the second stream after every N fixed-length blocks within the second stream, where N is an integer value.

3. The integrated circuit component of claim 2 further comprising a programmable register to store the integer value N and output the integer value N to the block injection circuitry.

4. The integrated circuit component of claim 1 wherein the temporal misalignment between the first and second intervals manifests as nonzero instances of both the first and second temporal offsets.

5. The integrated circuit component of claim 1 wherein the first stream of fixed-length blocks of symbols having first length-modifiable blocks of symbols spaced from one another at first intervals is conveyed and bears information in compliance with a Peripheral Component Interconnect Express (PCIe) specification, and wherein the first length-modifiable blocks of symbols comprise skip ordered set symbols as defined by the PCIe specification.

6. The integrated circuit component of claim 1 wherein the stream alignment circuitry comprises circuitry to detect that the temporal misalignment has been reduced, by virtue of adjusting lengths of successive ones of the second length-modifiable blocks, below a first threshold and assert an alignment signal in response.

7. The integrated circuit component of claim 6 further comprising a path-selection circuit to switch from outputting the first stream to outputting the second stream based at least in part on assertion of the alignment signal.

8. The integrated circuit component of claim 1 wherein the stream alignment circuitry to adjust lengths of successive ones of the second length-modifiable blocks lengths comprises circuitry to adjust lengths of successive ones of the second length-modifiable blocks in response to information indicating an operational status of the first stream.

9. A method of operation within an integrated circuit component, the method comprising:
receiving a first stream of fixed-length blocks of symbols having first length-modifiable blocks of symbols spaced from one another at first intervals within the first stream; and
embedding second length-modifiable blocks of symbols at second intervals within a second stream of fixed-length blocks of symbols, including adjusting lengths of successive ones of the second length-modifiable blocks relative to counterpart ones of the first length-modifiable blocks to reduce a temporal misalignment between the first and second intervals;
wherein adjusting lengths of successive ones of the second length-modifiable blocks comprises determining whether first temporal offset between a selected one of the second length-modifiable blocks and prior-received one of first length-modifiable blocks is greater or less than second temporal offset between the selected one of the second length-modifiable blocks and an after-received one of the first length-modifiable blocks; and
wherein adjusting lengths of successive ones of the second length-modifiable blocks comprises increasing the length of at least one of the second length-modifiable blocks by a predetermined number of symbols relative to the length of a counterpart one of the first length-modifiable blocks if the first temporal offset is greater than the second temporal offset, and decreasing the length of the at least one of the second length-modifiable blocks by a predetermined number of symbols relative to the length of the counterpart one of the first length-modifiable blocks if the first temporal offset is less than the second temporal offset.

10. The method of claim 9 wherein embedding the second length-modifiable blocks of symbols at second intervals within the second stream of fixed-length blocks of symbols comprises injecting each of the second length-modifiable blocks of symbols into the second stream after every N fixed-length blocks within the second stream, where N is an integer value.

11. The method of claim 10 further comprising storing the integer value N within a programmable register of the integrated circuit component.

12. The method of claim 9 wherein the temporal misalignment between the first and second intervals manifests as nonzero instances of both the first and second temporal offsets.

13. The method of claim 9 wherein the first stream of fixed-length blocks of symbols having first length-modifiable blocks of symbols spaced from one another at first intervals is conveyed and bears information in compliance with a Peripheral Component Interconnect Express (PCIe) specification, and wherein the first length-modifiable blocks of symbols comprise skip ordered set symbols as defined by the PCIe specification.

14. The method of claim 9 further comprising detecting that the temporal misalignment has been reduced, by virtue of adjusting lengths of successive ones of the second length-modifiable blocks, below a first threshold and asserting an alignment signal.

15. The method of claim 14 further comprising switching a path-selection circuit to output the first stream instead of the second stream based at least in part on assertion of the alignment signal.

16. The method of claim 9 further comprising receiving information indicating an operational status of first stream and wherein adjusting lengths of successive ones of the second length-modifiable blocks comprises adjusting lengths of successive ones of the second length-modifiable blocks in response to the information indicating the operational status of the first stream.

* * * * *